United States Patent Office 3,298,898
Patented Jan. 17, 1967

---

3,298,898
SOLAR INFRARED ABSORBERS
Walter George Gall, Shellbourne, Del., assignor to E. I. du Pont de Nemours and Company, Wilmington, Del., a corporation of Delaware
No Drawing. Filed Mar. 6, 1962, Ser. No. 177,731
11 Claims. (Cl. 161—199)

This invention relates to the use of infrared light absorbers to reduce the heat transmission of constructions transparent to visible light.

Conventional vehicle windshields, rear windows, side glass panels, and ceiling glass panels transmit all wavelengths of light about equally. The sun emits electromagnetic radiation over a wide, continuous band of wavelengths stretching from the ultraviolet to the far infrared region. Because of attenuation by adsorption by atmospheric water vapor, carbon dioxide, and ozone, and scattering by atmospheric dust particles, only a relatively narrow band of wavelengths, from $0.29\mu$ to $2.1\mu$, penetrates to sea level on the earth. The intensity of this radiation is peaked sharply at $0.50\mu$, so that radiation in the region from $0.29\mu$ to $0.40\mu$, commonly called the near ultraviolet, comprises only 4% of the total solar energy reaching the earth, with the remaining 96% distributed almost equally between the visible (0.40 to $0.75\mu$) and the near infrared (0.75 to $2.1\mu$). Therefore, it can be seen that by selectively absorbing or reflecting the infrared and transmitting the visible light in vehicle windows, one can decrease the heating effect of the sun on the interior of such vehicles.

It is an object of this invention to provide an absorber which absorbs infrared more than visible radiation.

This invention has as a further object the provision of an infrared absorber which can be incorporated in the polyvinyl butyral interlayer of safety-glass.

These objects are accomplished by the following invention in which an iron quinone oxime chelate is incorporated in the interlayer of safety-glass.

In the past, near infrared radiation has been absorbed by transition metal ions, many of which have weak absorption bands in the near infrared. Of these, the ferrous ion is highly selective, exhibiting little visible absorption. Two brands of such infrared absorbing glass depending on mixtures of metallic ions are available, namely "Solex," made by Pittsburgh Plate Glass Company and "EZ–I," made by Libby-Owens-Ford. When made into standard windshields using two 120 mil glass layers and a 15 mil polyvinyl butyral interlayer, the sandwich has a visible transmission of 69% and infrared transmission of 25%. The absorption bandwidth of these materials is $0.70\mu$ to $1.47\mu$. However, these metal oxides cannot be used in the interlayer which, being only $\frac{1}{17}$ the thickness of the glass, require absorbers that are much more intense.

The invention involves a group of iron quinone oxime chelates. They are iron chelates of o-quinone monoximes which are tautomeric with o-nitrosophenols.

The details of preparing two such infrared absorbing iron chelates of o-quinone monoximes are disclosed in the following examples. Others can be prepared by substituting molecular equivalents of other aromatic hydroxy compounds for those used in the two examples.

Example I

Sodium nitrite (7.15 g.) was dissolved in a solution of 0.1 mole of 2-naphthol and 4.0 g. of sodium hydroxide in 175 ml. of water at 0° C., and a cool solution of 7.3 ml. of concentrated sulfuric acid in 15 ml. of water was then added dropwise, with vigorous stirring, keeping the temperature at 0° C. When the acid addition was completed, the mixture was stirred an additional two hours at 0° C. and the product was then separated by filtration, washed and dried. To a solution of 5.20 g. of this product in 250 ml. of methyl alcohol, 3.92 g. of ferrous ammonium sulfate hexahydrate dissolved in 30 ml. of water was added to produce ferrous 1,2-naphthoquinone-1-oximate, which has the structure

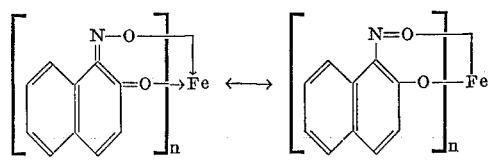

This chelate forms a greenish, black precipitate which is then separated by filtration, washed, and dried. In the above formula, $n$ is 3 as the solution was herein prepared, however, $n$ may be either 2 or 3. If the hexacoordinated product is prepared, the iron will have a net change of $-1$ so the isolated chelate is associated with some positive ion that is present during its preparation. Here it is associated with the ammonium ion from the ferrous ammonium sulfate. The chelate formed by this example is compatible with polyvinyl butyral, forming a green solution, and has sufficient thermal stability to permit mixing by extrusion. It has an absorption maximum at 780 m$\mu$ and a peak visible transmission at 550 m$\mu$. Laminates prepared from 15 mil polyvinyl butyral and two 120 mil glass sheets have the characteristics shown in Table I.

TABLE I

| Chelate | Concentration of Chelate in Interlayer, Percent | Absorption Bandwidth, m$\mu$ | Percent Transmission at Absorption Maximum |
|---|---|---|---|
| Ferrous | 0.05 | 620–880 | 19 |
| Do | 0.1 | 610–910 | 3.5 |
| Ferric | 0.1 | 600–890 | 9 |

The ferric chelate shown in Table I is prepared the same as the ferrous chelate of Example I, except 2.70 g. of ferric chloride hexahydrate are substituted for the ferrous ammonium sulfate of Example I.

Example II

A saturated aqueous solution of 14.3 g. of sodium nitrite was added dropwise, with vigorous stirring to a solution of 0.1 mole of 2,7-dihydroxynaphthalene in 200 ml. of 90% acetic acid which was kept at 0° C. After the addition was completed, the mixture was stirred for two hours at 0° C. The nitroso derivative was then isolated by adding 400 ml. of water, followed by filtration of the precipitated solid. Then 2.18 g. of the thus formed nitroso derivative were dissolved in 80 ml. of warm ethyl alcohol, to which 3.92 g. of ferrous ammonium sulfate dissolved in 20 ml. of water were added to form the ferrous chelate. The precipitate which formed was filtered, washed, and dried. The thus formed ferrous chelate, dissolved in a 15 mil thickness polyvinyl butyral sheet, had an infrared absorption band from 640–985$\mu$ where the transmission was 7.5% at 0.1% concentration, and 2% at 0.2% concentration of the chelate.

Various other comparable chelates have been prepared according to either the aqueous preparation of Example I or the acetic acid preparation of Example II. The infrared characteristics of illustrative ferrous chelates are given in Table II, all of which are formed by the aqueous method.

TABLE II

| | Wt. Percent Dissolved in 15 Mil Thick Polyvinyl Butyral | Absorption Bandwidth, mμ | Absorption Peak, mμ | Percent Transmission at Absorption Peak |
|---|---|---|---|---|
| Ferrous 1,2-naphthoquinone-2-oximate | 0.1 | 630–910 | 770 | 22 |
| Ferrous 6-bromo-1,2-naphthoquinone-1-oximate | 0.1 | 615–880 | 765 | 23 |
| Do | 0.2 | 615–880 | 765 | 11 |
| Ferrous 3-hydroxy-1,2-naphthoquinone-1-oximate | 0.2 | 610–870 | 750 | 7.5 |
| Ferrous 5-hydroxy-1,2-naphthoquinone-1-oximate | 0.2 | 650–870 | 770 | 31 |
| Ferrous 7-hydroxy-1,2-naphthoquinone-1-oximate | 0.2 | 650–970 | 800 | 8 |
| Ferrous chelate of 1,3-dintrosoresorcinol (DNR) dispersion | 0.2 | 650–970 | 825 | 29 |
| Ferrous chelate from mixture of 0.5 mole (DNR) plus 1.0 mole of 1-nitroso-2-naphthol | 0.1 | 600–900 | 760 | 4.5 |
| Ferrous chelate from mixture of 1.2 moles (DNR) plus 0.6 mole of 1-nitroso-2-naphthol | 0.1 | 620–980 | 770 | 5 |

The chelates of this invention have the structure

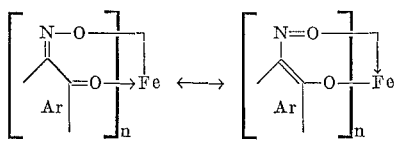

Ar can be benzene, naphthalene or a multi-ring compound, $n$ can be either 2 or 3 giving either ferric or ferrous chelates. Also, if the dinitrosation product of a dihydroxy aromatic compound is converted to an iron chelate, two such quinone oxime chelate structures may be present on the single aromatic ring structure, as was produced in Example II. Other metals were tried in an attempt to produce a series of chelated salts, but none of these others were found satisfactory.

Suitable amounts of the iron chelates of this invention in polyvinyl butyral are from 0.01 to 2%. The only reason found to stay within this range is the insufficient infrared absorption below 0.01% and the sheet becomes too dark to see through under normal lighting if over 2% is used. At high concentrations, many of these chelates are insoluble in polyvinyl butyral, causing a haze. Where haze is not objectionable, an insoluble chelate may be used by dispersing it in the polyvinyl butyral. The iron chelates of this invention are useful in any transparent medium in which they are soluble or dispersible. In general, such media are polar synthetic resins. Examples of such resins are polycarbonates, acrylics, and polyamides. The infrared absorbers of this invention can be incorporated in the resin by adding to the extrusion powder prior to extrusion or by melting in with the resins.

As an example of the utility of these absorbers in other resins, 0.02% of the ferrous 1,2-naphthoquinone-1-oximate was melt blended into "Lucite" 140, Du Pont acrylic resin. The mixture was then molded into a 75 mil sheet which had an absorption maximum at 780 mμ (4% transmission) and an absorption bandwidth of 610–910 mμ.

Table III shows the results of studies of weatherability using ferrous 1,2-naphthoquinone-1-oximate in the presence of various ultraviolet stabilizers. This absorber was tested as a 0.1% solution in polyvinyl butyral. The listed transmission changes are all in terms of the increase in transmission overall at the visible maximum and infrared minimum after 600 hours of Fadeometer exposure. This exposure was carried out in accordance with the standard test method 16A–1957 of the American Association of Textile Chemists and Colorists.

TABLE III

| Protection | Percent Visible Increase | Percent Infrared Increase |
|---|---|---|
| Unprotected (200 hrs.) | 34 | 56 |
| Dipped in 1% nickel dibutyldithiocarbamate | 8.5 | 3.5 |
| 1% 2,2'-dihydroxy-4-methoxy benzophenone with chelate | 26.5 | 36 |
| Laminated with "Solex" glass as UV absorbing protection | 19 | 7.5 |

The dipping in nickel dibutyl-dithiocarbamate is preferred.

The infrared absorbing constructions of this invention are useful as welders' goggles, sunglasses, and as devices interposed between the light source and the film in movie and slide projectors to protect the film from excess heat, in addition to their usefulness in vehicle windows.

I claim:

1. A polyvinyl butyral resin having dissolved therein from 0.001 to 2 percent of an iron chelate having the structure

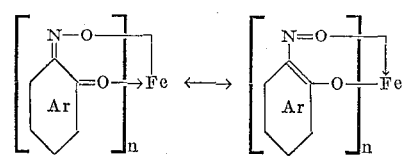

where $n$ is an integer selected from the group consisting of 2 and 3 and Ar is an aromatic ring derived from the group consisting of benzene and naphthalene which may be substituted with a group selected from the group consisting of hydroxyl and bromyl.

2. The resin of claim 1 wherein the aromatic ring Ar is derived from naphthalene.

3. The resin of claim 1 wherein the iron chelate is ferrous 1,2-naphthoquinone-1-oximate.

4. The resin of claim 1 wherein the aromatic ring Ar is serviced from benzene.

5. A safety-glass laminate having an interlayer formed of polyvinyl butyral having dissolved therein from 0.01 to 2 percent of an iron chelate having the structure

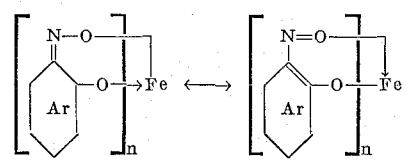

where $n$ is an integer selected from the group consisting of 2 and 3 and Ar is an aromatic ring derived from the group consisting of benzene and naphthalene which may be substituted with a group selected from the group consisting of hydroxyl and bromyl.

6. The article of claim 5 wherein the aromatic ring Ar is derived from naphthalene.

7. The article of claim 6 wherein said interlayer is protected with an ultraviolet stabilizer.

8. The article of claim 7 wherein said interlayer is provided with an ultraviolet stabilizer in a separate layer.

9. The safety-glass laminate of claim 7 wherein the iron chelate is ferrous 1,2-naphthoquinone-1-oximate.

10. The article of claim 9 wherein the ultraviolet stabilizer is nickel dibutyl-dithiocarbamate.

11. The safety-glass laminate of claim 5 wherein the aromatic ring Ar is derived from benzene.

No references cited.

MORRIS SUSSMAN, *Primary Examiner.*

W. J. VAN BALEN, *Assistant Examiner.*